US012705352B2

(12) United States Patent
Braggs

(10) Patent No.: US 12,705,352 B2
(45) Date of Patent: Aug. 11, 2026

(54) SCANNING FOR MALWARE BASED ON PROCESS IDENTIFICATION

(71) Applicant: SOPHOS LIMITED, Abingdon (GB)

(72) Inventor: Steven J Braggs, Oxford (GB)

(73) Assignee: Sophos Limited, Abingdon (GB)

( * ) Notice: Subject to any disclaimer, the term of this patent is extended or adjusted under 35 U.S.C. 154(b) by 614 days.

(21) Appl. No.: 17/981,946

(22) Filed: Nov. 7, 2022

(65) Prior Publication Data

US 2024/0152613 A1 May 9, 2024

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
CPC ......................... G06F 21/566; G06F 2221/034
USPC ............................................................ 726/23
See application file for complete search history.

(56) References Cited

U.S. PATENT DOCUMENTS 9,871,809 B2 * 1/2018 Katz ................... H04L 63/1416
12,079,364 B2 * 9/2024 Kuppusamy .............. G06F 8/61
2002/0178383 A1 * 11/2002 Hrabik ................ H04L 63/1416 709/224
2009/0282485 A1 * 11/2009 Bennett ................. H04L 63/145 707/999.003
2017/0243004 A1 * 8/2017 Kinder .................. G06F 9/4406
2020/0394305 A1 * 12/2020 Cosgrove ................ G06F 21/56
2022/0179956 A1 * 6/2022 Kim ...................... G06F 21/566
2022/0253524 A1 * 8/2022 Gadient .............. G06F 11/1469
2023/0394146 A1 * 12/2023 Dubin ..................... G06F 21/53
2025/0005604 A1 * 1/2025 Budano ................ G06Q 10/087

FOREIGN PATENT DOCUMENTS

WO WO-2022170170 A1 * 8/2022 .......... G06F 11/1469

* cited by examiner

*Primary Examiner* — Aubrey H Wyszynski
(74) *Attorney, Agent, or Firm* — IP Spring

(57) ABSTRACT

Systems and methods to scan for malware on devices based on process identification. In some implementations, a computer-implemented method includes intercepting an event initiated by a particular process that executes on a system, which pauses the event. It is determined whether to perform a security scan for the event based on a comparison of a type of the event with stored event classification information associated with the particular process. If performing the security scan, a scan of the intercepted event is performed (e.g., sent to a user mode service that executes on the system), and based on the scan, the intercepted event is allowed to proceed or a security operation is performed associated with the intercepted event. If not performing the security scan, the intercepted event is allowed to proceed.

20 Claims, 5 Drawing Sheets

| Process Identifier | Unique Identifier | File Open event | File Close event | Registry Write event | ••• |
|---|---|---|---|---|---|
| 1234 | 5231233 | Yes | No | Yes | ••• |
| 4567 | 3412321 | No | No | No | ••• |
| 3219 | 9837721 | Yes | Yes | No | ••• |
| ⋮ | | | | | |

SCANNING FOR MALWARE BASED ON PROCESS IDENTIFICATION

TECHNICAL FIELD

Implementations relate generally to scanning for malware on computer devices, and more particularly, but not exclusively, to methods, systems, and computer readable media to detect malware based on identifying processes executing on a device.

BACKGROUND

Computer devices of all forms are developed and used at ever-increasing rates. Devices that can access networks via wired or wireless connections have proliferated. Consequently, the variety of threats, devices, applications, and communication protocols has also increased. Implementing and maintaining effective computer security in dynamic and rapidly changing device and network environments can be a challenge.

One aspect of maintaining computer security includes scanning events that are initiated by processes executing on a device. For example, a file open event may open a file that could potentially be malware, and so the file is to be scanned prior to allowing it to execute on a device. Traditional anti-virus software captures and processes many different events for every process that is initiated. Typically, a kernel mode driver identifies the events from the operating system, such as file open, file read, registry write, and other events, and sends those events to a user mode service to process. The user mode service can be an application process running in a user mode or other higher layer than the kernel mode driver that can be made more secure from other software and components of the device.

Anti-malware software typically makes a decision for an event as to whether to allow the event to proceed or to cancel or ignore the event. However, a large number of events processed in this way, including events for processes which are safe or benign, can lead to degradation of performance of devices. Furthermore, there may be security threats based on certain events such as files opened by processes, which in many cases traditional threat detection software may not detect.

SUMMARY

In general, some implementations may include systems and methods to scan for malware on devices based on process identification. In some implementations, a computer-implemented method includes intercepting, by one or more processors, an event initiated by a particular process that executes on a system and pausing the event. It is determined whether to perform a security scan for the event based on a comparison of a type of the event with stored event classification information associated with the process identifier. In response to a determination to perform the security scan, a scan of the intercepted event is caused to be performed, and, based on the scan, the intercepted event is allowed to proceed or a security operation is performed associated with the intercepted event. In response to a determination to not perform the security scan, the intercepted event is allowed to proceed.

In some implementations of the method, the security operation associated with the intercepted event includes blocking the intercepted event, and/or stopping the particular process from execution on the system. In some implementations, the event classification information is based on an evaluation of an executable file associated with the particular process to determine types of events initiated by the particular process that are to receive the security scan.

In some implementations, causing the scan of the event to be performed includes sending the intercepted event to a user mode service that executes on the system, and receiving a reply from the user mode service, wherein allowing the intercepted event to proceed or performing the security operation associated with the intercepted event are based on the reply. In some examples, the user mode service scans data associated with the particular process or associated with the intercepted event and determines whether to allow the intercepted event to proceed or to perform the security operation associated with the intercepted event.

In some implementations, the method further includes, prior to intercepting the event, obtaining the event classification information from the user mode service that executes on the system, including detecting that the particular process has initiated, sending a request to the user mode service, and receiving the event classification information from the user mode service. In some implementations, the method includes, after determining whether to perform the security scan for the intercepted event, obtaining updated event classification information from the user mode service and using the updated event classification information to determine whether to perform a security scan for a subsequent event initiated by the particular process. In some implementations, intercepting the event includes intercepting a file open event for a target file and sending the intercepted event to the user mode service, and the user mode service scans the target file.

In some implementations, the method further includes determining a process identifier of the particular process, and associating the event classification information with the process identifier. In some implementations, the method further includes determining a unique identifier for the particular process, and storing the unique identifier in a data structure that associates the unique identifier with the process identifier of the particular process. In some implementations, associating the event classification information with the process identifier includes temporarily storing the event classification information in, or referenced by, a context associated with a file object that is associated with an executable file that is opened to initiate the particular process. In some implementations, associating the event classification information with the process identifier includes detecting an image load event associated with the particular process, and in response, accessing the event classification information in or referenced by the context and associating the event classification information with the process identifier. In some implementations, determining the process identifier of the particular process includes: detecting a process start event for the particular process, and in response, obtaining and storing the process identifier of the particular process.

In some implementations, the particular process is a first process and the event classification information is first event classification information, and the method further includes obtaining second event classification information associated with a second process executing on the system, wherein the second event classification information is different than the first event classification information. In some implementations, the method further includes storing the event classification information in a data structure, wherein the event classification information is accessed from the data structure while the particular process is executing on the system.

In some implementations, the event classification information includes instructions for a plurality of types of events that can be performed by the particular process. In some implementations, the types of events include file open, file close, file read, file write, start process, exit process, registry read, and/or registry write. In some implementations, the computer-implemented method is performed by a kernel driver that executes on the system. In some implementations, the method further includes determining, based on an evaluation of an executable file associated with the particular process, whether files that are opened by the particular process are to be scanned; determining that the event is a file open event to open a file; obtaining a list of file information including file name extensions and/or file types; if all files that are opened by the particular process are to be scanned, or if the file has a file name extension or a file type in the list of file information, determining to perform a security scan for the file open event; and if not all files opened by the particular process are to be scanned and the file does not have any of the file name extensions or the file types in the list of file information, allowing the file open event to proceed.

In some implementations, a system includes one or more hardware processors and a memory with instructions stored thereon, and when executed by the processors, the instructions cause the processors to perform operations similar to the features of the above computer-implemented method. In various implementations, the execution of the instructions cause the one or more processors to perform operations further comprising any of the features described above for the computer-implemented method.

In some implementations, a computer-readable medium includes instructions stored thereon that, when executed by one or more hardware processors, cause the one or more processors to perform operations similar to the above computer-implemented method. In various implementations, the execution of the instructions cause the one or more processors to perform operations further comprising any of the features described above for the computer-implemented method.

In some implementations, a computer-implemented method includes intercepting, by one or more processors, an event that is to open and execute an executable file to initiate a particular process on a system, and determining, based on a scan of the executable file, whether to scan files that are opened by the particular process. The method includes, in response to a determination to scan the files that are opened by the particular process, storing a scan indicator and associating the scan indicator with a process identifier of the particular process, wherein the scan indicator indicates to scan the files opened by the particular process. In response to detecting file open events initiated by the particular process to open one or more of the files, the scan indicator associated with the process identifier is accessed to cause respective scans of the one or more files. In response to a determination to not scan the files that are opened by the particular process, the file open events performed by the particular process are allowed to proceed.

In some implementations of the method, the method further includes providing a list of file information including file name extensions and/or file types, and in response to a determination to not scan the files that are opened by the particular process and a determination that the one or more files have at least one of the file name extensions or file types in the list of file information, causing a security scan of the one or more files to be performed. In some implementations, determining whether to scan the files that are opened by the particular process includes requesting a user mode service to scan the executable file and receiving a determination from the user mode service whether to scan the files that are opened by the particular process. In some implementations, the scan of the executable file is performed by an anti-malware kernel driver executing on the system.

In some implementations, a device includes one or more hardware processors and a memory with instructions stored thereon; when executed by the processors, the instructions cause the processors to perform operations similar to the features of the above computer-implemented method. In various implementations, the execution of the instructions cause the one or more processors to perform operations further comprising any of the features described above for the computer-implemented method.

In some implementations, a computer-readable medium includes instructions stored thereon that, when executed by one or more hardware processors, cause the one or more processors to perform operations similar to the above computer-implemented method. In various implementations, the execution of the instructions cause the one or more processors to perform operations further comprising any of the features described above for the computer-implemented method.

DETAILED DESCRIPTION

Figure 1:
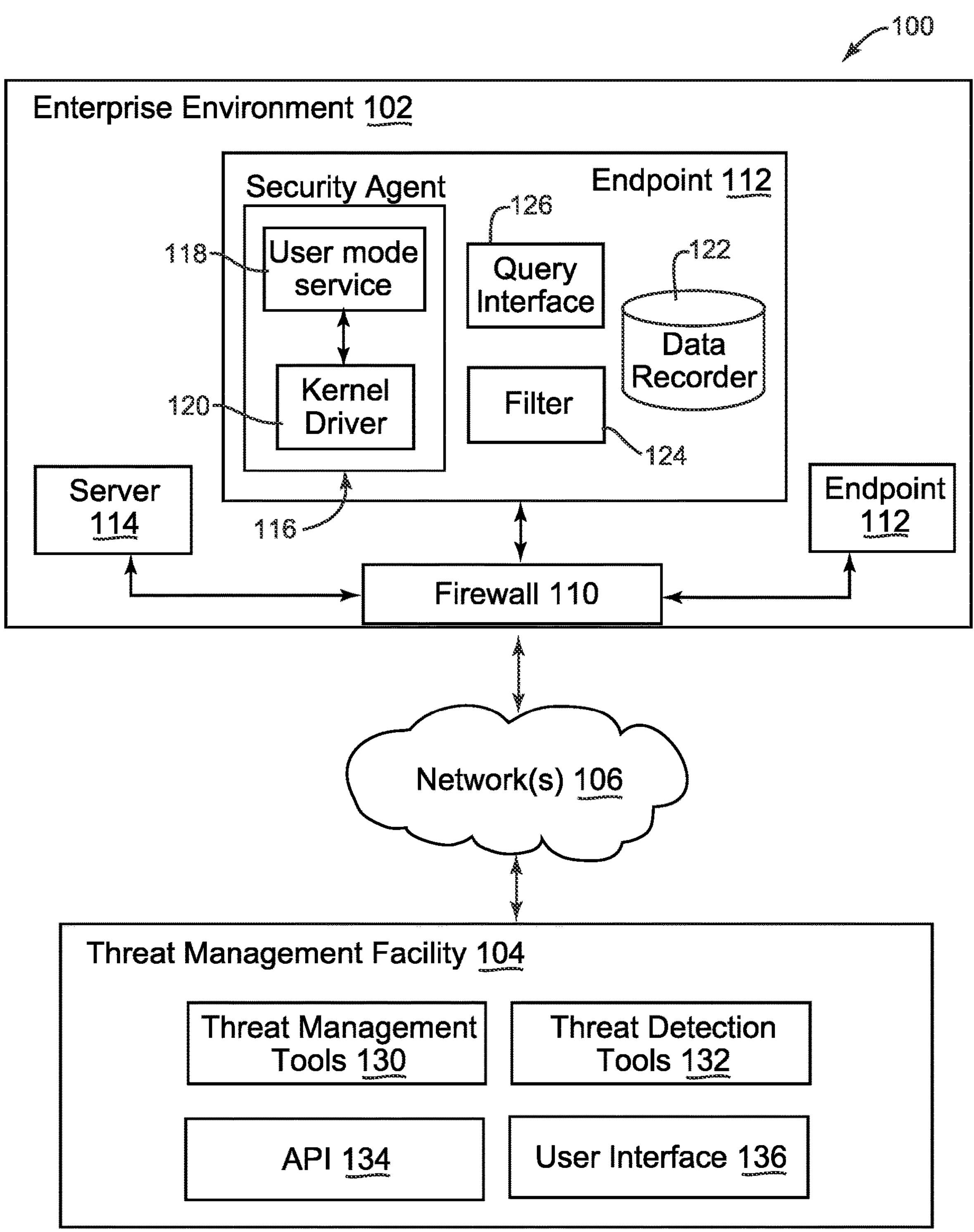
FIG. 1 is a diagram of an example network environment, in accordance with some implementations.

One or more implementations relate to scanning of events and/or files for malware on devices based on identifying processes executing on the devices. In some implementations, a method can be performed by a kernel driver, for example, and can include intercepting and pausing an event initiated by a particular process that executes on a system and determining whether to perform a security scan for the event based on a comparison of a type of the event with stored event classification information (or scan indicator) associated with the particular process. If a security scan is to be performed, the intercepted event can, in some examples, be sent to a user mode service that executes on the system, and based on a reply from the user mode service, the intercepted event is allowed to proceed or a security operation is performed on the intercepted event (e.g., blocking the event and/or stopping the process from executing). If no security scan is to be performed, the intercepted event is allowed to proceed, e.g., without obtaining a security scan of the event.

Various other features are also described. For example, prior to intercepting the event, the event classification information can be obtained from the user mode service, e.g., when the process is initiated on the device and scanned by the user mode service. The event classification information can be based on an evaluation of an executable file associated with the particular process to determine types of events that will receive the security scan. The event classification information can include instructions for multiple types of events, and different processes can be associated with different event classification information.

In some implementations, a process identifier of the particular process can be determined and associated with the event classification information. In some examples, the event classification information can be initially stored in a context of a file object of the executable file, and then associated with the process identifier of the particular process that is later obtained. In additional features, the event classification information can be updated by the user mode service by sending information to the kernel driver, e.g., in response to updates such as detection of additional threats related to the particular process, etc.

In some example implementations, an event may be associated with a file ("file events") (such as a file open event, file write event, etc.), and it can be determined whether to scan files (e.g., all files) that are to be processed by the particular process, or to allow one or more files to be processed without scanning. When the kernel driver detects a file open event (or other file event) initiated by the particular process to open or otherwise process a particular file, a scan indicator (e.g., included with event classification information) associated with the process identifier is accessed to determine whether a scan of file events, and thus the particular file, is to be performed prior to the file being processed. Otherwise, the file event is allowed to proceed without scanning the particular file. In some implementations, additional information or instructions can also be used, such as list access instructions that indicate whether or not to consult a list (or lists) of file information when determining whether to scan a file in a file event. If the list access instructions instruct to consult the list, the file can be compared to the list of file information that includes file names (e.g., portions of file names and/or file name extensions) and/or file types. If the file has a file name extension or file type in the list (and in some implementations, if the event is also instructed to be scanned via the event classification information), the event is scanned.

Described features can provide various advantages. For example, using one or more described techniques, a kernel driver can be intelligent in sending events to the user mode service for processing based on the process that initiated the events. By referring to event classification information that is based on identifying the process that initiates the events, the kernel driver can quickly determine which events are potentially malicious and which are not, and can send the potentially malicious events to the user mode service while allowing benign events to proceed without scanning. This reduces a significant amount of processing of events on a device, e.g., events from processes that are known to be benign are not scanned for security threats. This allows a kernel driver to monitor a large number of events without significant processing delay, e.g., many more events can be monitored than was practical in prior technology.

In traditional systems, a fixed set of events are processed for every process, leading to inefficient processing of events. By contrast, a system using described features can, for example, choose to process particular event types based on the known characteristics of the process that initiated those event types, and can process different events for different processes. Described features can be used to distinguish threats at an individual event level, e.g., to allow particular benign events to proceed while blocking potentially malicious events. For example, the system can process all file opens, but skip all file closes for a particular process. A system using described features can also choose to scan process events for every file or apply a filter to the files and/or to the events, e.g. process events only for files with file name extensions or file types on a predetermined list. Malware protection on a device can thus be tuned based on the process that is performing a particular operation and based on individual events and files (or other data) that are processed, to ensure both performance and security goals are achieved.

In addition, described features have a reduced need to change the kernel driver once it is released, as it can be easily reconfigured to send different events to the user mode service via updates to event classification information from the user mode service.

Furthermore, some described implementations can efficiently identify certain types of processes for which files (e.g., all files) opened by those processes are to be scanned. For some types of processes, any file the process opens could include malicious code (for example, scripting engines such as JavaScript). For example, processes can be identified upon load of an executable file, and instructions can be received, e.g., from a user mode service, whether to scan all files opened by those processes. By contrast, traditional anti-virus software avoids scanning of files of a certain type, for example, only based on the file name extension of the file to be opened. This approach does not work where files having any name and that can include executable code can be opened by certain types of programs. Thus, described features can provide greater security against threats or malicious actors when handling many types of processes and programs, while also reducing the computing load of scanning for malware.

FIG. 1 is a block diagram of an example network environment 100 which be used to enable secure hashing of files transmitted between elements a computer network, according to some implementations. In some implementations, network environment 100 include an enterprise environment 102 and a threat management facility 104 coupled via a network 106. In some implementations, network environment 100 can include other servers or devices not shown in FIG. 1.

The example enterprise environment 102 can include any networked computer-based infrastructure. For example, enterprise environment 102 can be corporate, commercial, organizational, educational, governmental, etc. As home networks can also include more computer instances at home and remotely (e.g., accessible via the cloud or internet), enterprise environment 102 can also or instead include a personal network such as home or a group of homes. The network of the enterprise environment 102 can be distributed among a plurality of physical premises such as buildings on a campus and can be located in one or in multiple geographical locations. The configuration of enterprise environment 102 is shown as one example, and there can be any number of compute instances, fewer or more of each type of compute instance, and other types of compute instances.

Enterprise environment 102 includes different types of computer systems. For example, as shown, enterprise environment 102 can include a firewall 110, one or more endpoints 112 (two are shown in FIG. 1), and one or more servers 114.

Firewall 110 can monitor and block or allow incoming and outgoing data traffic between other network devices and enterprise environment 102, and can be implemented in hardware and/or software. Other devices can also be included in enterprise environment 102, e.g., a wireless access point, etc.

One or more endpoints 112 can be a part of (or coupled to) the enterprise environment 102. Each endpoint 112 can be any type of endpoint device or other compute instance described herein. Endpoint 112 can include, for example, any of an end-user computing device, mobile device, an appliance (e.g. a smart speaker, a thermostat, etc.), or Internet-of-Things (IoT) device, etc. An endpoint 112 can also or alternatively be a firewall, gateway, routers, and/or any other computing device or computing instance that can connect to the enterprise environment 102.

One or more of endpoints 112 can include a security agent 116, that can include one or more application programs or other programs, drivers, etc. Security agent 116 can locally support threat management on endpoint 112, such as by monitoring for malicious activity, managing security components on endpoint 112, maintaining policy compliance, and communicating with threat management facility 104 to support threat security. Security agent 116 can, for example, coordinate instrumentation of the endpoint 112 to detect various event types involving various computing objects on the endpoint 112, and supervise logging of events in a data recorder 122. Security agent 116 can also or alternatively scan computing objects such as electronic communications or files, monitor behavior of computing objects such as executables, etc. Security agent 116 can, for example, apply signature-based or behavioral threat detection techniques, machine learning models, or any other tools or the like suitable for detecting malware or potential malware on endpoint 112.

In some implementations, security agent 116 can include one or more user mode services 118 and one or more kernel drivers 120. User mode services 118 can execute in a user mode of the processor and/or operating system, e.g., in which an application or driver runs in a private address space, in isolation, and cannot alter data that belongs to another application. When a user-mode application starts, the operating system creates a process for the application that executes on the device in the user mode.

User mode services 118 can communicate with one or more kernel drivers 120. Kernel driver 120 can be implemented in a kernel mode at a kernel layer of the operating system, and can access and affect data of drivers, processes, and the operating system. Drivers running in the kernel mode are not isolated, and thus a crash of a kernel driver can crash the operating system. In some examples, kernel drivers 120 can detect, intercept, suspend (e.g., pause), and stop events that occur for and by application processes, e.g., initiating a process, opening a file, writing to a file or a registry, etc.

In some implementations, endpoint 112 can include data recorder 122, which can be a database or other data storage. Data recorder 122 can be used to log events occurring on or related to the associated endpoint 112, as well as store other data. Such logged events can include, for example, events associated with computing objects on endpoint 112, such as file and registry manipulations, software installations, and so forth. Logged events can also include activities directed from endpoint 112, such as requests for content from Uniform Resource Locators (URLs) or other network activity involving remote resources. Data recorder 122 can record data at any frequency and any level of granularity consistent with proper operation of endpoint 112.

In some implementations, endpoint 112 can include a filter 124 to manage of a flow of information from data recorder 122 to a remote resource such as threat detection tools 130 of threat management facility 104. For example, a local agent on the endpoint 112, such as security agent 116, can filter the data stored on the data recorder 122 (e.g., data indicating events) and feed a filtered data stream to threat management facility 104. In this manner, a detailed log of events can be maintained locally on each endpoint, while network resources can be conserved for reporting of a filtered event stream that contains information believed to be most relevant to threat detection. Filter 124 can also or alternatively be configured to report causal information that causally relates collections of events to one another. Filter 124 can be configurable so that, for example, threat management facility 104 can increase or decrease the level of reporting based on a current security status of the endpoint, a group of endpoints, the enterprise environment 102, and other network components. The level of reporting can also or alternatively be based on currently available network and computing resources, or any other appropriate context.

In some implementations, endpoint 112 can include a query interface 126 to allow remote resources such as threat management facility 104 to query data recorder 122 for additional information. The query can include a request for specific events, activity for specific computing objects, or events over a specific time frame, or a combination of two or more of these. Thus, for example, threat management facility 104 can request all changes to the registry of system information for the past 48 hours (or any time period), all files opened by system processes in the past day (or any time period), all network connections or network communications within the past hour (or any time period), or any other parameterized request for activities monitored by data recorder 122. In another aspect, the entire data log, or the entire log over some predetermined window of time, can be requested for further analysis at a remote resource.

In some implementations, enterprise environment 102 can also include one or more servers 114 that are connected to firewall 110 and endpoints 112. A server 114 can include one or more computing devices (e.g., a cloud computing system, a cloud computing instance, a rackmount server, a server computer, cluster of physical servers, virtual server, etc.).

Threat management facility 104 can detect, evaluate, and remediate threats or potential threats. Facility 104 can include one or more of a variety of threat management tools 130 to aid in the detection, evaluation, and remediation of these threats or potential threats. Threat management tools 130 can be used to manage or remediate threats to enterprise environment 102 that have been identified with threat detection tools 132 or otherwise. Threat management tools 130 can, for example, include tools for sandboxing, quarantining, removing, or otherwise remediating or managing malicious code or malicious activity. The threat management facility 100 can control access between the enterprise environment 102 and devices outside environment 102, and/or can control access to within enterprise environment 102 networks, e.g., restrict access to certain applications, networks, files, printers, servers, databases, and so on.

Threat management tools 130 can include functionality, for example, to scan applications, files, and data for malicious code, remove or quarantine applications and files, prevent certain actions, perform remedial actions, as well as other security measures. For example, tools 130 can scan an outgoing file (e.g., from enterprise environment 102) and verify that the file is permitted to be transmitted according to policies. By checking outgoing files, threats can be discovered that were not detected in enterprise environment 102. Scanning may use any of a variety of techniques, including, without limitation, file signatures, identities, classifiers, and other suitable scanning techniques. In some implementations, the scanning may include scanning some or all files on a periodic basis, scanning an application when the application is executed, scanning data transmitted to or from a device, scanning email and other communications, scanning in response to predetermined actions or combinations of actions, scan and so forth. The scanning of applications, files, and data may be performed to detect known or unknown malicious code or unwanted applications. Application behavior can also be analyzed before or as an application runs (e.g., monitoring code behavior, application programming interface calls made to libraries or to the operating system, monitoring activities such as, for example, reading and writing to memory, reading and writing to disk, network communication, process interaction etc.). Web security control can also be provided, e.g., reporting on suspect compute instances, security and content filtering, active monitoring of network traffic, Uniform Resource Identifier (URI) filtering, and the like. Network access control can also be provided, e.g., stop unauthorized, guest, or non-compliant systems from accessing networks, control access to virtual private networks (VPN), etc., as well as reputation filtering for known sources of malware. Aspects of the malicious code protection may be provided, for example, in security agent 116 of endpoint 112, in a wireless access point, and/or firewall 110, as part of application protection provided by the cloud, and so on.

Policy management can also be provided by threat management facility 104 that manages rules or policies for the enterprise environment 102. For example, policies can include access permissions associated with networks, applications, compute instances, users, content, data, and the like, and can be stored using a database, a text file, other data store, or a combination thereof. Some examples of policies include a block list or allowed list can be used that identifies particular or types of network locations, applications, etc.; restricting particular activities (e.g., messaging or email) to particular endpoints under particular conditions; dynamic policies that can be adjusted based on contextual or other information; etc.

In some examples, threat management facility 104 can locally or globally tune filtering by local agents based on a current data stream, and can query local event data recorders for additional information where necessary or helpful in threat detection or forensic analysis. Threat management facility 104 can also or alternatively store and deploy a number of security tools, such as a web-based user interface that is supported by machine learning models to aid in the identification and assessment of potential threats by a human user. This can, for example, include machine learning analysis of new network traffic, models to provide human-readable context for evaluating potential threats, and any of the other tools or techniques described herein.

Threat management facility 104 can perform a range of threat management functions. In some implementations, facility 104 can include one or more threat detection tools 132, an application programming interface (API) 134 to interface with third party services from trusted security vendors, and a user interface 136 for access to threat management and network administration functions, and.

Threat detection tools 132 can include any tools for detecting threats or potential threats within a network such as network 106. Detection tools 132 can include, for example, network behavior tools, machine learning models, etc. Threat detection tools 132 can use network traffic data caused by endpoints within the network, as well as any other available context (e.g., heartbeats) to detect malicious software or potentially unsafe conditions for a network or endpoints connected to the network. In some implementations, threat detection tools 132 can usefully network activity data from a number of endpoints (including, e.g., network components such as gateways, routers, and firewalls) for improved threat detection in the context of complex or distributed threats. Threat detection tools 132 can also or alternatively include tools for reporting to a separate modeling and analysis platform, e.g., to support further investigation of security issues, creation or refinement of security status detection models or algorithms, review, and analysis of security breaches, etc.

Application programming interface (API) 134 can provide a programmatic interface for customer or other third-party context, information, administration and security tools, and so forth. API 134 can also or alternatively provide a programmatic interface for hosted applications, identity provider integration tools or services, and so forth. In some examples, API 134 can support programmatic connections with third party services that facilitate exchange of data between threat management facility 104 and the third-party services. API 134 can, for example, connect to Active Directory or other customer information about files, data storage, identities and user profiles, roles, access privileges, and so forth.

User interface 136 can provide an interface for user interaction with threat management facility 104, e.g., for threat detection, network administration, audit, configuration, and so forth. For example, user interface 136 can include a web site or other graphical interface, or other interface. User interface 136 can facilitate curation of potential threats, e.g., by presenting threats along with other supplemental information, and providing controls for a user to dispose of such threats as desired, e.g., by permitting execution or access, by denying execution or access, or by engaging in remedial measures such as sandboxing, quarantining, vaccinating, and so forth.

Threat management facility 104 can include event detection and event logging facilities to detect and store collected events so that they can be accessed and analyzed. In some implementations, events collected in data recorder 122 of an endpoint 112 can be retrieved and stored by threat management facility 104.

When a threat or other policy violation is detected by threat management facility 104, remedial action may be taken by a remedial action facility of threat management facility 104. Such action can take a variety of forms, e.g., collecting additional data about the threat, terminating or modifying an ongoing process or interaction, sending a warning to a user or administrator, downloading a data file with commands, definitions, instructions, or the like to remediate the threat, requesting additional information from a device such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions.

In some implementations, threat management facility 104 can provide reputation filtering, which can target or identify sources of known malware. For instance, reputation filtering can include lists of URLs of known sources of malware or known suspicious IP addresses, code authors, code signers, or domains, that when detected may invoke an action by the threat management facility 104. Based on reputation, potential threat sources may be blocked, quarantined, restricted, monitored, or some combination of these, before an exchange of data can be made. Aspects of reputation filtering may be provided, for example, in security agent 116 of an endpoint 112, in firewall 110, wireless access point, as part of application protection provided by the cloud, and so on. In embodiments, some reputation information may be stored on a compute instance 112 or 114 and other reputation data available through cloud lookups to an application protection lookup database.

Threat management facility 104 can include a variety of additional facilities, such as a security management facility, update facility, definitions facility, network access rules facility, detection techniques facility, application protection facility, asset classification facility, entity model facility, analytics facility, dynamic policies facility, identity management facility, marketplace management facility, etc. It should be understood that the threat management facility 104 may be implemented in whole or in part on a number of different compute instances, with some parts of the threat management facility on different compute instances in different locations. For example, some or all of one or more of the various facilities, including the facilities 130-136, may be provided as part of security agent 116 that is included in software running on an endpoint 112 within enterprise environment 102. Some or all of one or more of the facilities can be provided on the same physical hardware or logical resource as a gateway, such as a firewall 110 (or a wireless access point, etc.). Some or all of one or more of the facilities may be provided on one or more cloud servers or cloud computing instances that are operated by the enterprise or by a security service provider.

Threat management facility 104 (and/or security agent 116) can provide protection against a plurality of threats, such as malware, viruses, spyware, cryptoware, adware, Trojans, spam, intrusion, policy abuse, improper configuration, vulnerabilities, improper access, uncontrolled access, and more. Threat management facility 104 may communicate with, coordinate, and control operation of security functionality at different control points, layers, and levels within the network environment 100. In various implementations, the threat management facility 100 may provide protection from a variety of threats to a variety of compute instances in a variety of locations and network configurations.

As one example, users of the threat management facility 104 may define and enforce policies that control access to and use of compute instances, networks and data. Administrators may update policies such as by designating authorized users and conditions for use and access. Threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 104 may provide many different services including policy management.

Network 106 can be any of various types of communication networks, including one or more of a public network (e.g., the Internet), a private network (e.g., a local area network (LAN) or wide area network (WAN)), a wired network (e.g., Ethernet network), a wireless network (e.g., an 802.11 network, a Wi-Fi® network or wireless LAN (WLAN)), a cellular network (e.g. a Long Term Evolution (LTE) network), routers, hubs, switches, server computers, or a combination thereof.

In some implementations, a third-party provider can make available one or more additional facilities to the enterprise environment 102 via the threat management facility 104, e.g., to provide additional functionality or capabilities to the threat management facility 104 and endpoints 112. The third-party provider can be a physical security event provider, a system provider, a specialized analytics provider, etc. The provider, with appropriate permissions and authorization, may receive and send events, observations, inferences, controls, convictions, policy violations, or other information to threat management facility 104. In some implementations, an identity provider can be connected to network 106, and can be any remote identity management system or the like configured to communicate with threat management facility 104. For example, the identity provider can confirm identity of a user, provide or receive other information about users that may be useful to protect against threats, create, maintain, and manage identity information for principals while providing authentication services to relying party applications in a network, offer user authentication as a service, and/or provide user identity information (e.g., such as multi-factor authentication), e.g., to a SaaS application.

In some implementations, threat protection provided by the threat management facility 104 can extend beyond the network boundaries of the enterprise environment 102 to include clients (or client facilities) such as endpoints or other devices or computing instances outside the enterprise environment 102. In some implementations, endpoints 112 and/or other compute instances of network 106 may communicate with various servers outside enterprise environment 102, e.g., cloud applications, such as a SaaS application, which can be an application that is used by but not operated by the enterprise environment 102; or unprotected servers such as a web site or a third-party application through an internetwork such as the Internet or any other public network, private network or combination of these.

Endpoints, devices, compute instances or the like that are referred to as "within" an enterprise network may also be "associated with" the enterprise network, e.g., where such assets are outside an enterprise gateway but nonetheless managed by or in communication with a threat management facility or other centralized security platform for the enterprise network.

Some implementations can use any type of system or device to execute one or more methods described herein. Some implementations can provide features described herein on a device that is disconnected from or intermittently connected to computer networks and/or other devices.

Scanning for Malware Based on Process Identification

Figure 2:
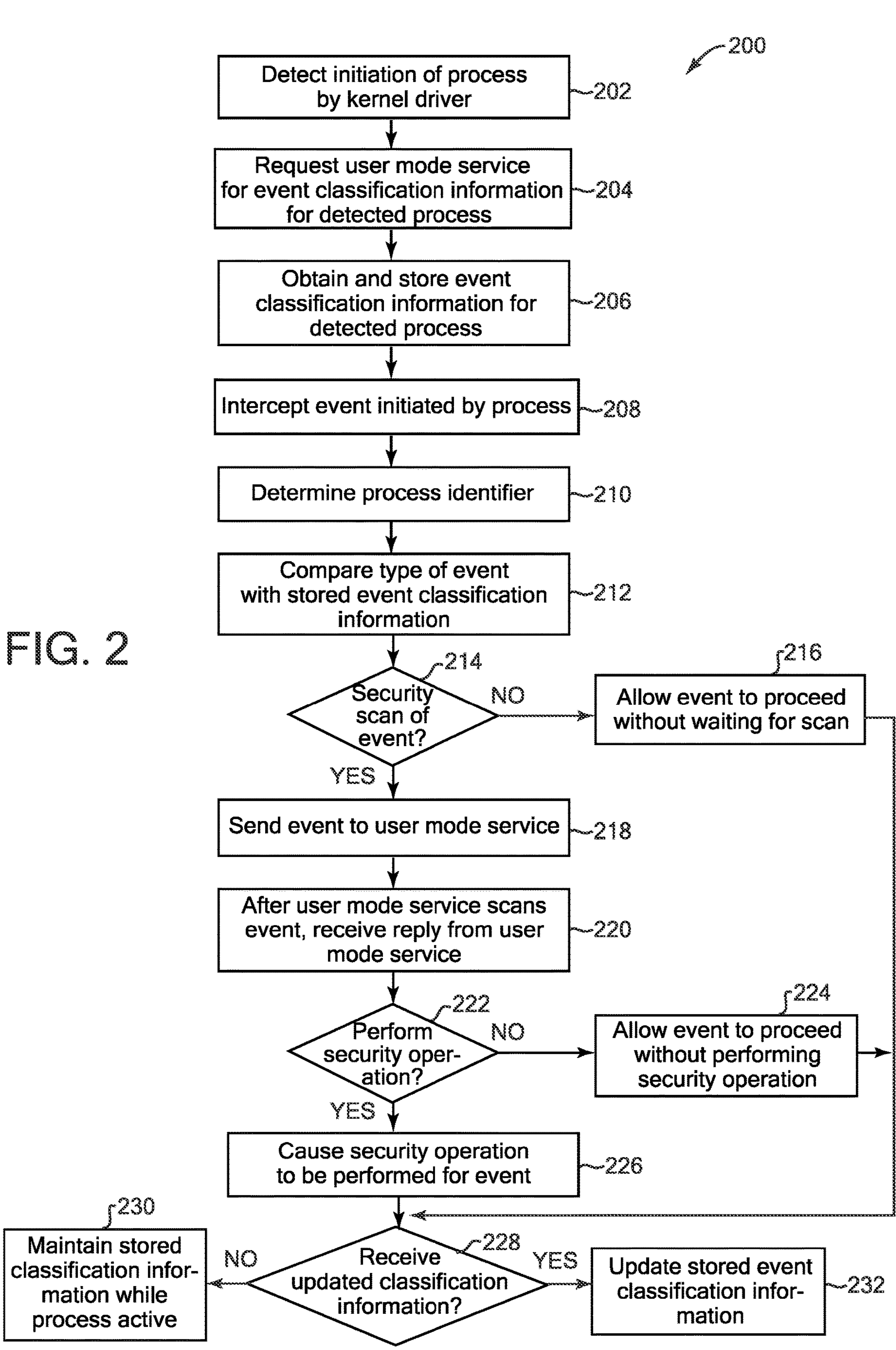
FIG. 2 is a flow diagram of an example method to scan for malware based on process identification, in accordance with some implementations.

FIG. 2 is a flow diagram illustrating an example method 200 to scan for malware based on process identification. Method 200 can be implemented, for example, on an endpoint device coupled to a communications network, e.g., one or more endpoints 112 of FIG. 1. For example, in some implementations, method 200 can be performed by security agent software executing on the endpoint device as described above. In some implementations, method 200 can be implemented on other devices connected to a network, e.g., a server 114, firewall device 110, wireless access point, threat management facility 104, or other device not connected to a network. In described examples, the implementing device includes one or more digital hardware processors or processing circuitry ("processors") and one or more storage devices. In some implementations, different components or facilities of a device can perform different blocks or other parts of the method 200.

In described examples, the implementing device can execute a security agent which can implement one or more blocks of method 200. For example, the security agent can be or include an anti-virus scanner or program, or other security program or threat detection program. In some implementations, the security agent can include a user mode service executing in a user mode of the operating system of the device, and a kernel driver executing in a kernel mode of the operating system, similarly as described above with respect to FIG. 1.

In some implementations, method 200, or portions of the method, can be initiated automatically by a device, periodically performed and/or performed based on the occurrence of one or more particular conditions. For example, such conditions can include one or more process events as described herein, e.g., an executable file being opened in response to user input provided to the device or being opened in response to other input (e.g., from another device or program), a file being opened by a process, a registry being accessed for read or write, etc. In other examples, such conditions can include one or more conditions occurring which can be specified in settings of the device implementing method 200. In some implementations, such conditions can be previously specified by a user in stored custom preferences of the user (accessible by a device or method with user consent).

As referred to herein, an "event" in the context of the described methods can be an action or occurrence on a device as recognized by a kernel driver executing on the device and which can be handled by software of the device. Some events may include multiple of such actions or occurrences. An event relates to a process that executes on the device, e.g., in user mode. The process is created by the operating system for an application program or other executable program. For example, an event can be an executable file opened in response to user input to the operating system, which causes the operating system to create a process associated with the executable file. In further examples, an event can be a process querying a file, registry or database, etc. Events can include, for example, network events, process events, registry events, file system events, etc.

Method 200 can begin at block 202. In block 202, initiation of a particular process is detected by a kernel driver. In some examples, the particular process can be a process created by the operating system of the device in response to input, such as user input that initiates execution of an executable file of the application, or other input to the device from a different source (e.g., another process executing on the device). For example, the process initiation can be an opening of an executable file, and the kernel driver detects the opening of the executable file and intercepts the start of the particular process associated with the executable file. In some implementations, this can be detection of an open event for an executable file, similarly as described below with respect to FIG. 4. In some implementations or cases, the kernel driver suspends the execution of the file (e.g., pauses the process) while one or more of the following blocks are performed; for example, process execution can be suspended until event classification information is obtained in block 206. Block 202 can be followed by block 204.

In block 204, the kernel driver requests a user mode service for event classification information associated with the process detected in block 202. For example, when the kernel driver detects the initiation (e.g., process start event) of the executable file in block 202, it sends a reference for the executable file backing the particular process to the user mode service (e.g., as described below with respect to method 400 of FIG. 4). The user mode service can access and scan the executable file to evaluate the executable file, e.g., perform threat detection and other tasks. The user mode service performs this evaluation of the executable file to determine which types of events initiated by the particular process are to be security scanned and which types of events do not need to be security scanned, and this determination can be indicated in event classification information.

In some examples, the user mode service can be part of an anti-virus scanner program, a threat-detection program, and/or a security agent executing on the device. The user mode service can use any of numerous threat detection processes and other processes to determine if the executable file includes malware or performs malicious activity for the device. For example, the user mode service can perform a virus scan and/or other malware scans on the executable file, can examine reputation information for the executable file, and/or can obtain threat detection results from a different device, e.g., threat management facility 104. In some examples, the user mode service can scan the file by reading it and comparing its contents against known virus signatures.

In some implementations, the kernel driver can skip the request to the user mode service, e.g., for some types of processes. For example, if the particular process detected in block 202 is a child process that is initiated by a parent process, then in some implementations the child process can be assigned the same event classification information that has been assigned to the parent process and the request is not needed. In some implementations, a request for event information can be sent for a child process which can have its own event classification information separate from the parent process.

In some implementations, the kernel driver can perform some or all of threat detection, scanning, and/or evaluation of the executable file that is performed by the user mode service as described above. In some of these implementations, the kernel driver can omit sending the request to the user mode service. Block 204 can be followed by block 206.

In block 206, the kernel driver obtains event classification information for the particular process from the user mode service contacted in block 204 (or the kernel driver determines the event classification information in some implementations), and the kernel driver stores the event classification information. As described herein, the event classification information includes information that indicates which event types of events initiated by the particular process are to be security scanned, and which event types of the events are not to be security scanned. In some examples, the kernel driver can store the event classification information in a data structure, e.g., a table, that can be readily accessed by the kernel driver. Some examples of a table are described below with respect to FIG. 3.

In some implementations, the event classification information can include, or be accompanied by, notify instructions that indicate, in a case that the event is not to be scanned, whether to send the event to the user mode service to notify the user mode server, or to not send the event to the user mode service. In some implementations, such notify instructions can be independently provided for each event type of the event classification information; for example, it can be included in the event classification information, e.g., in the table described above.

In some implementations, the event classification information can include, or be accompanied by, additional information used in determining whether to security scan the event for the particular process. The additional information can include a scan indicator that, for example, indicates whether or not to scan all files that are opened or otherwise targeted by the event (e.g., scan all file events) by the particular process. In some implementations, the additional information can include list access instructions that indicate whether to access a list (or other data structure) of file information such as file names and/or file types. Further examples of such implementations are described below with reference to FIG. 4. In some implementations, the notify instructions and/or the additional information described above can be obtained by kernel driver from other sources or in other ways, In some implementations, the kernel driver stores the event classification information in a context associated with a file object that is associated with the executable file processed by the user mode service (or can store a reference or index in the context that points to the event classification information stored in a different storage location). The kernel driver then can obtain the process identifier for the particular process after a process start event is detected for the particular process. The kernel driver can detect an image file load event that includes a reference to the file object and the process identifier, allowing the kernel driver to associate the process identifier from the process start event with the event classification information stored in the context of the file object. Further examples of similar implementations that can be used in method 200 are described with reference to FIG. 4. In some implementations, other methods can be used to associate the process identifier with the event classification information.

In some implementations, the kernel driver can determine and assign a unique identifier (unique ID) to the particular process, e.g., in block 206 after obtaining the process identifier for the particular process. For example, the operating system may re-use one or more same process identifiers for different processes that initiate on the device. The kernel driver can uniquely identify a process by creating a unique ID for the process. In some examples, the unique ID can be any number that can be associated with the process identifier, e.g., a number based on a monotonically increasing sequence as each unique ID is assigned, a number based on the current device time, etc., and/or the unique ID can include, or be based on, the process identifier of the process. When the process identifier is described as being used in method 200 (e.g., in communications between the kernel driver and the user mode service), then the unique ID can also or alternatively be used to be sure that the appropriate process is identified.

Block 208 can be performed after block 206 and while the particular process is still active on the device. In block 208, an event that is initiated by the particular process is intercepted by the kernel driver. For example, kernel driver can be registered with the operating system to be notified of events. Intercepting the event includes pausing the event.

The event can be any of a variety of events that can be performed by processes that execute on the device. For example, the event can be any of a variety of file operations, e.g., Create (open), Cleanup (file handle close), Close (file close), Read, Write, SetInformation (includes, rename, delete, create hard and soft links), SetSecurity, SectionSync (prepares to map a file section into memory; for example, mapping an executable section of a file that is about to run as a new process), etc. The event can be any of a variety of process operations relating to a process, e.g., Start process, Exit process, Start thread, Exit thread, etc. The event can be any of a variety of registry operations, e.g., Create registry key, Rename registry key, Set registry value, Restore registry key, Replace registry key, Query registry key value, Query registry key, Query multiple registry keys, Query registry key name, Query registry key security, etc. Other events can also be intercepted and processed by method 200. Block 208 can be followed by block 210.

In block 210, a process identifier is determined for the intercepted event. In some implementations, the process identifier for the active particular process is obtained from the operating system, e.g., from the event. For example, when the kernel driver receives the event it can be running in the context of the process that is initiating the event, so it can obtain the operating system process identifier. In some cases, the driver can use the PID to look up a unique identifier associated with the particular process. Block 210 can be followed by block 212.

Figure 3:
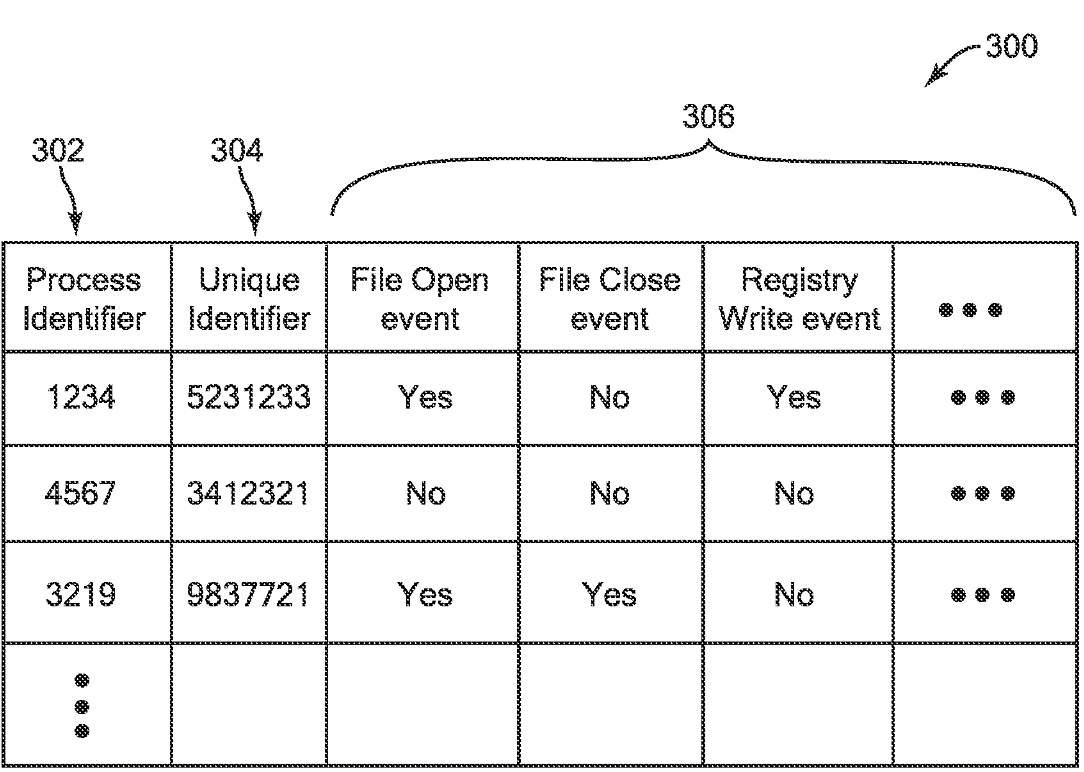
FIG. 3 is a diagram of an example table that can be used to store event classification information, in accordance with some implementations.

In block 212, the event is compared with stored event classification information that was obtained in block 206. The process identifier or the unique identifier of the particular process is used to find entries in the stored event classification information, e.g., in a table or other data structure. A type or classification of the intercepted event can be compared with types of events indicated in the stored event classification information to find a matching event type to the intercepted event type, to obtain the scan indicator or instructions associated with the intercepted event for the particular process. An example of a table that can be used in methods 200 and 400 is shown in FIG. 3. In some implementations, a two stage lookup can be used, e.g., process ID to unique ID, and then unique ID to table entry; or there can be a mapping against two indices for process ID and unique ID, or a separate table for each of process IDs and unique IDs. These configurations allow event classification information in a table entry to be determined based on process ID or unique ID. In some implementations, additional information can be also accessed in block 212, such as the scan indicator and/or list access instructions described herein. Block 212 can be followed by block 214.

In block 214, it is determined, based on the comparison made in block 212, whether the kernel driver is to cause a security scan of the event. For example, event classification information in the data structure accessed in block 212 can indicate whether to scan the event.

In some implementations, additional information can be used to determine whether to scan the event, such as a scan indicator and/or list access instructions. For example, in some implementations, if the event targets (e.g., opens) a file, a scan indicator can be used to determine whether to scan all such events, and thus this event, similarly as described with reference to FIG. 4. In some implementations, if the scan indicator indicates to scan all such events, the event classification information can be ignored for those events. In other implementations, the scan indicator instructing to scan all events can be implemented by providing a scan indicator or instruction in the table for each of those events (e.g., a "yes" indicator is stored for each of those events, with reference to FIG. 3).

In some example implementations, list access instructions (as described above) can be used. For example, in some implementations, if the scan indicator indicates to not scan all file events, but the event classification information indicates to scan the event, then a security scan is to be performed, and if the event classification information indicates to not scan the event, the scan is not to be performed.

In some implementations, if event classification information indicates to scan the event, the list access instructions are also consulted as an additional possible filter. For example, if list access instructions indicate to consult the list of file information for the particular process, and the file to be opened is present on the list (e.g., has a file name extension or file type on the list), then a security scan is to be performed for the event. In this example, if the file is not present on the list, the scan is not to be performed (even if the event classification information indicates to scan the event). List access instructions can be implemented as instructions separate from the event classification information, or can be included within the event classification information (e.g., within a table such as table 300 of FIG. 3).

If it is determined that a security scan of the intercepted event is not to be performed based on block 212, then the method continues to block 216, in which the intercepted event is allowed to proceed (e.g., resume). For example, if the event is a file open event, the file is allowed to be opened by the particular process. In some implementations, the kernel driver can send the benign event to the user mode service to inform the service of the event, and the kernel driver does not wait for a reply and allows the event to proceed (by enabling the process to resume) without waiting for or obtaining a security scan for the event. In some implementations, the kernel driver does not send the benign event to the user mode service. In some implementations, whether to send or not send the benign event to the user mode service can be determined based on accessing notify instructions that are included in (or accompanies) the event classification information, as described above. In some implementations, the kernel driver can periodically or occasionally send a benign event to the user mode service so that the user mode service can monitor events. In addition, the kernel driver can continue to check for initiation of a process (such that block 202 is performed) and to check for events initiated by executing processes (such that block 208 is performed). In some implementations, block 216 can be followed by block 228, described below.

If it is determined in block 214 to cause a security scan of the intercepted event based on the comparison of block 212, then the method continues to block 218, in which the event and the process identifier is sent to the user mode service with a request for a security scan. In some implementations, data is sent with the event to the user mode service in the request to enable the user mode service to scan the file and perform other actions, where the data sent can vary based on the type of the event. In some implementations, the intercepted event is associated with (e.g., operates on) target data (e.g., the event opens, accesses, or otherwise interacts with target data that is target file(s), process(es), or registry entr(ies)), and an identification of (or reference to) the target data can be sent to the user mode service so that the user mode service can scan the target data for security threats. Block 218 can be followed by block 220.

In block 220, after the user mode service scans the event, a reply is received by the kernel driver from the user mode service. The user mode service can scan the event and determine if there are any threats or potential threats that would occur if the event proceeds, using any of a variety of scanning and threat detection techniques, and indicate whether to perform a security operation to block (e.g., stop or cancel) the event or perform other actions. The user mode service can do a variety of actions, which can depend on the event and, e.g., the information that the user mode service has saved about the process and/or the target data (e.g., file or registry key) that is the subject of the event. For example, the user mode service can scan the executable file of the particular process, look up information about the target data from previously saved information, etc.

In some examples, if the event is to open, write to, clean up, set information for, set security for, or close a target file, the user mode service can scan the file; if the event is to map a section of a target file into memory, the user mode service can scan the target file or file section; if the event is to start or exit another process or a thread, the user mode service can scan the other process or the thread; if the event is to create, rename, restore, replace, or query a target registry value or key, the user mode service can scan the target registry value or key. Other types of events can be similarly scanned for malware or other security threats.

In some implementations, the user mode service can provide a reply with a positive or negative result, indicating whether the event is malicious (or potentially malicious) or benign. In some implementations, the reply from the user mode service can indicate other information, e.g., whether to block the event and/or to stop the particular process from executing on the device. Block 220 can be followed by block 222.

In block 222, it is determined whether the kernel driver is to perform a security operation based on the reply from the user mode service. For example, the reply can indicate the event is malicious (or potentially malicious), which indicates that a security operation is needed from the kernel driver. The reply can indicate the event is benign, which indicates that no security operation is needed. If the reply indicates that a security operation is not needed, then the method continues to block 224, in which the kernel driver allows the event to proceed (e.g., to resume) without performing a security operation. For example, if the event is a file open event, the target file is allowed to be opened by the particular process (in some implementations, other threat detection techniques can be applied to the event or file). In addition, the kernel driver can continue to check for initiation of a process (such that block 202 is performed) and to check for events initiated by executing processes (such that block 208 is performed). In some implementations, block 224 can be followed by block 228, described below.

If it is determined in block 222 to perform a security operation of the intercepted event based on the reply from the user mode service received in block 220, then the method continues to block 226, in which the kernel driver causes a security operation to be performed for the event. In some implementations, the kernel driver can block the event from occurring on the device, e.g., the event is stopped, discarded, or cancelled and is not performed. In some implementations, the kernel driver can block the event from occurring and also stop the particular process from continuing execution (e.g., terminate the process), e.g., if the event has been found to originate from malware or other malicious software, which may indicate that the particular process is malware. In some implementations, block 226 can be followed by block 228.

In block 228, it is determined whether updated event classification information is received from the user mode service. Block 228 can be performed at any time during method 200, e.g., any time after block 204 in which the classification information is requested. For example, block 228 can be performed after the user mode service receives an event from the kernel driver in block 218, where the user mode service has determined that the event classification information should be updated based on an evaluation of the event (e.g., the type or classification of the received event is determined by the user mode service to be associated with malicious activity, when previously it was determined to be benign). In another example, the user mode service may have received other information related to the particular process or events performed by the particular process, which may have changed the event classification information for one or more types of events for the particular process. The user mode service can receive information about the process from any source and change the classification of events for that process.

In some implementations, the user mode service can determine updated event classification information in response to any of various conditions, e.g., periodically after a predetermined amount of time has passed; in response to one or more other processes being initiated on the device; reception of particular information by the device; as a result of processing an event sent from the kernel driver from the particular process or from another process; as a result of a change of configuration of the user mode service; as a result of new mal ware signatures being received; as a result of a digital signature, previously relied on, being revoked; etc.

If updated event classification is not received by the kernel driver in block 228, then the method continues to block 230, in which the existing stored event classification information is maintained in storage. In some implementations, the event classification information associated with the particular process is maintained in storage (e.g., memory) while the particular process is active (e.g., executing on the device) and that classification information can be removed from the storage in response to the particular process becoming inactive and stopping its execution on the device. This can allow the user mode service to re-scan the particular process (e.g., another process associated with the same executable file) when it is initiated again at a later time.

If updated event classification information is received by the kernel driver in block 228, then the method continues to block 232, in which the updated event classification is stored in place of the previous stored event classification information. For example, new information can be stored in place of older information in the data structure, or a new table or other data structure can be stored in place of the previous data structure.

In some implementations, commands can be sent by the user mode service to the kernel driver that instruct the kernel driver to perform a respective security scan for all events to be initiated by the particular process, or to not perform any such security scan for all such events. In some of these implementations, no individual event classification information (that provides individual instructions for each of multiple types of events) is sent to or stored by kernel driver (e.g., in block 206). In some implementations, the user mode service can update (e.g., in block 228) previously provided individual event classification information by instructing the kernel driver to ignore any event classification information previously sent and stored for the particular process, and to perform a respective security scan for all events to be initiated by the particular process (or to perform no such scans for all such events).

In some implementations, initiation of any process on the device (such that block 202 is performed) and initiation of any events by executing processes on the device (such that block 208 is performed) can be monitored by the kernel driver during method 200. For example, events such as opening files (or other events) by the particular process can be detected in block 208, and/or can be detected in block 414 of FIG. 4.

FIG. 3 is a diagram showing an example table 300 that can be used to store event classification information (or includes information that is based on the received event classification information). The information can be, for example, received from the user mode service. For example, table 300 can be stored in an implementation of block 206 of FIG. 2, and table 300 can be updated in an implementation of block 232 of FIG. 2.

Table 300 can store event classification information for processes that are active on the device. In some example implementations, table 300 can include process identifiers 302, unique identifiers 304, and events 306 that have been classified into various types.

Process identifiers 302 are identifiers that have been assigned to various processes that are executing on the device, including, for example, the particular process associated with the application program that initiated in block 202 of FIG. 2, to identify those processes. Process identifiers 302 can be received by the kernel driver from the operating system in any of a variety of ways, e.g., with the information the driver gets from the operating system for particular events (e.g., CreateProcess, ExitProcess and Image load events), by calling a function exported by the operating system for the executing process (e.g., PsGetCurrentProcessId( ) function, etc.) In some implementations, each process identifier 302 is valid only while its associated process is executing, and a process identifier can be re-used by the operating system once the associated process has exited. Unique identifiers 304 can be identifiers that are assigned by the kernel driver to executing processes associated with process identifiers 302 to uniquely identify those processes, since the process identifiers 302 can be re-used when assigned to different processes by the operating system and thus are not necessarily unique. Events 306 can be any events of the system that are filtered for use by method 200 (or method 400), and can include, for example, a file open event, a file close event, a registry write event, etc. Any or all of the events that may occur on the device, or which are filtered for use by method 200, can be listed in table 300, such as any or all of the event examples described herein.

For each of the events 306 for each process, event classification information is indicated in table 300 that indicates whether, upon detecting the initiation of the event and determining the process identifier, a security scan is to be performed for that event (e.g., whether the kernel driver is to send the event to the user mode service to perform a security scan for that event). The kernel driver looks up an entry in table 300 upon detection of an event initiated by the identified process, based on the process identifier and event type. For example, upon detecting a file open event from a process, the kernel driver finds the unique ID (5231233) in table 300 that matches the unique ID of the process that initiated the event matches the unique ID (alternatively, the kernel driver can find the process identifier 302 of the process, e.g., if unique IDs are not used). The kernel driver looks in the file open event classification to see an instruction indicating a "yes," indicating that detected file open events are to be sent to the user mode service to be scanned. In other cases, a detected registry write event from the same process causes the kernel driver to send the registry write event to the user mode service to be scanned as indicated in table 300. In another example, based on the information in table 300 ("no"), the kernel driver does not send a detected file close event to the user mode service to be scanned, such that the file close event is allowed to proceed without obtaining a scan of that event.

As shown in table 300, different processes can have different event classification information, based on the evaluation of the processes by the user mode service. For example, based on associated information in table 300, file open events for a first process may be scanned, while file open events for a second process may be allowed to proceed without being scanned. In some implementations, different processes can each have a different set of event types for which the kernel driver checks in a data structure to determine scan indicators; e.g., event classification information may be omitted from being sent by the user mode service for some processes which cannot perform the events associated with that classification information. In some implementations, if there is no classification information for a process, a default action can be performed by the kernel driver until it is known from the user mode service as to which classification information to apply.

In some implementations, notify instructions can be included in table 300, which and used to indicate whether or not to send a benign event to the user mode service for notification and not for a security scan, as described above with respect to block 216 of FIG. 2. In some examples, instead of one of two possible instructions (e.g., "yes" or "no"), one of three possible instructions can be included in the table entries (e.g., "yes," "notify only" and "no") that respectively indicate to scan the event, to not scan the event and to send the event to the user mode service as notification, and to not scan the event and not send the event to the user mode service.

In further examples, in some implementations the three instructions can be described as "send and wait" (where the kernel driver sends the event to the user mode service to be scanned and waits for a reply from the user mode service), "notify only" (where the kernel driver sends the event to the user mode service and does not wait for a reply), and "skip" (where the kernel driver does not send the event to the user mode service to be scanned). For some types of events, a "yes" or "send and wait" result can be performed as a "notify only" result, e.g., if that type of event is not blocked (such as a file close event in some implementations). In some implementations or cases, after receiving a notification (e.g., "notify only") event from the kernel driver, the user mode service can, if appropriate, send a separate instruction to the kernel mode driver to terminate the particular process, e.g., if the user mode service has information about the particular process from the notification event and/or from a different source that causes it to issue such an instruction.

In some implementation, list access instructions, and/or other additional instructions that can filter events from being scanned, can be included in table 300 to help determine whether to scan an event, as described above with reference to FIG. 2. For example, each table entry in table 300 can include a scan instruction as described above, and/or instructions that instruct the kernel driver to cause a security scan of: files present on a list of filename extensions, files not present on the list of filename extensions, files present on a list of file types, files not present on the list of file types, files in all events, executable files in all events, or any combination of these instructions or other instructions. In some example implementations, a bit mask can be stored in each table entry for each type of event, indicating which one or more of the instructions is active for that entry.

Figure 4:
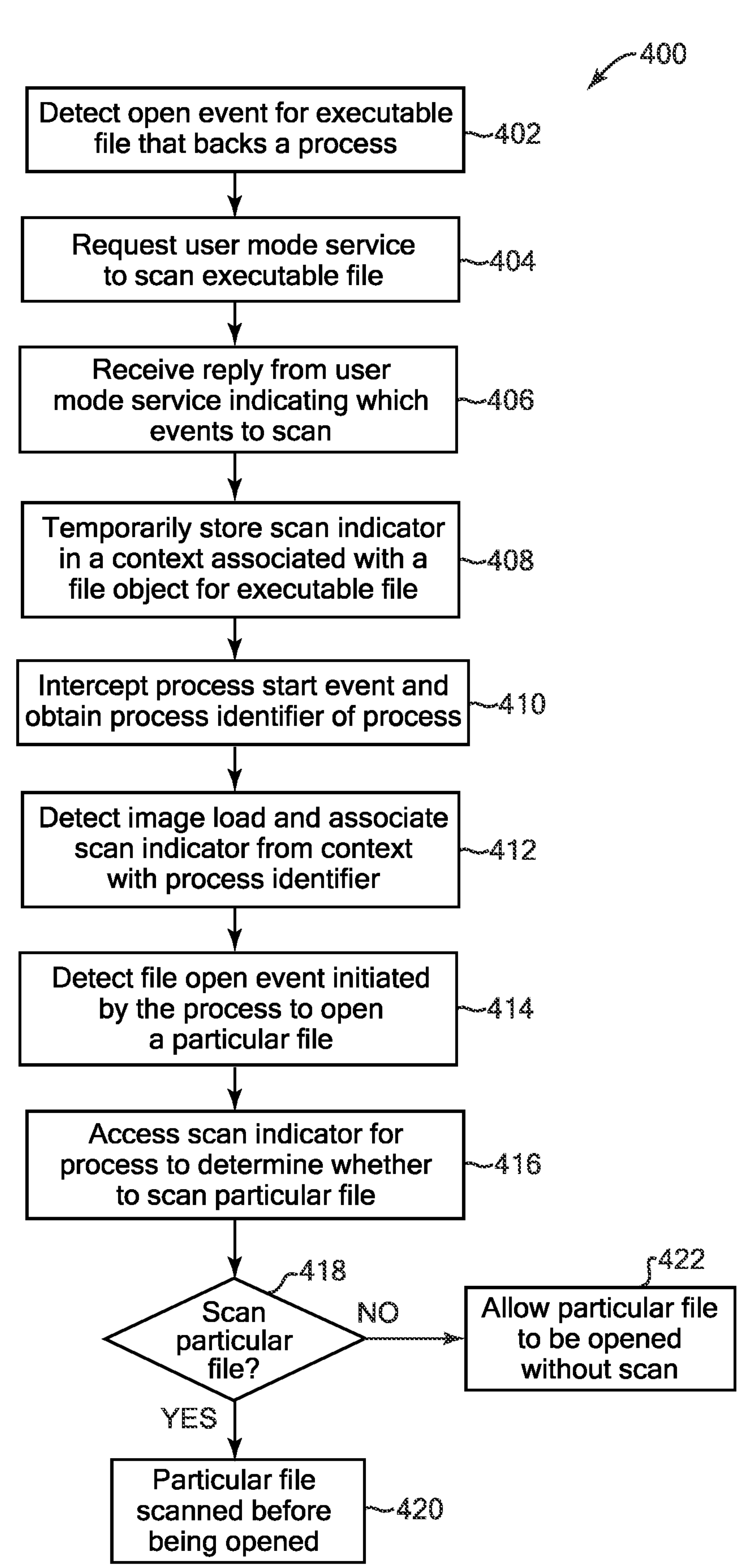
FIG. 4 is a flow diagram of an example method to scan files that are opened by a process based on process identification, in accordance with some implementations.

FIG. 4 is a flow diagram illustrating an example method 400 to scan files that are opened by a process based on process identification. Method 400 can be implemented, for example, on an endpoint device coupled to a communications network, e.g., one or more endpoints 112 of FIG. 1. For example, in some implementations, method 400 can be performed by security agent software executing on the endpoint device as described above. In some implementations, method 400 can be implemented on other devices connected to a network, e.g., a server 114, firewall device 110, wireless access point, threat management facility 104, or other device not connected to a network. In described examples, the implementing device includes one or more digital hardware processors or processing circuitry ("processors") and one or more storage devices. In some implementations, different components or facilities of a device can perform different blocks or other parts of the method 400.

In described examples, the implementing device can execute a security agent which can implement one or more blocks of method 400. For example, the security agent can be or include an anti-virus scanner or program, or other security program or threat detection program. In some implementations, the security agent can include a user mode service executing in a user mode of the processor and/or operating system of the device, and a kernel driver executing in a kernel mode of the operating system, similarly as described above with respect to FIG. 1.

In some implementations, method 400, or portions of the method, can be initiated automatically by a device, periodically performed and/or performed based on the occurrence of one or more particular conditions, similarly as described for method 200.

In some implementations, method 400 or 200 can be used to scan all files opened by particular types of processes (e.g., scan all events from these processes that open files). Any file that these types of applications can open can include malicious code. For example, these types of processes can include scripting engines such as JavaScript that can interpret any file as executable code. In some implementations of method 400 or method 200, not every file opened by a process is scanned. For example, the user mode service (or kernel driver) can determine whether to scan all files opened by a process as described above, e.g., based on a scan of the executable file for that process. In some implementations, if it is determined to not scan all files opened by the process, then particular files can be scanned. For example, a list of file information, e.g., file names (e.g., portions of file names or file name extensions), and/or file types, can be maintained in storage on the endpoint device (or other connected device) and only files with a file name (e.g., file name extension) or file type on the list are to be eligible to be scanned for security in method 400 or 200. Alternatively, in some implementations, only files with a file name or file type on the list are allowed to be opened without being scanned for security. In some implementations, list access instructions can indicate to ignore or override such a list of file information for a particular process, e.g., similarly as described above for FIG. 2.

Method 400 can be used to identify which processes should have those processes' opened files (e.g., in events that open files) scanned for malicious code. In some example implementations, method 400 can be used to detect types of programs (e.g., some scripting programs) that can interpret any file type as executable code, in which case method 400 can be used to scan all files that are opened by that type of process; and method 400 can be used to detect programs that can only execute code if it is in a specific format (e.g., a particular filename, such as a portion of a file name or filename extension), in which case method 400 can allow these types of processes to open files, and files that have the specific format can scanned or filtered out by one or more other techniques.

Method 400 can begin at block 402. In block 402, the kernel driver detects an open event for an executable file that backs a particular process. For example, the executable file can be associated with an application program for which the particular process will be created by the operating system of the device. In some examples, the executable file may have been selected to execute based on input, e.g., user input from a user (e.g., selecting a file in a GUI or command line user interface) or other action from a different source (e.g., the operating system launches the particular process). The kernel driver detects the opening of the executable file and intercepts the start of the particular process associated with the executable file. The kernel driver suspends the execution of the executable file while one or more of the following blocks are performed; for example, execution of the particular process (such as the process start event of block 410) can be suspended until the executable file is scanned in block 406. Block 402 can be followed by block 404.

In block 404, the kernel driver requests a user mode service to scan the executable file. The user mode service can be similar to the user mode service described above with reference to FIG. 2. For example, the user mode service can perform a scan based on one or more techniques for detecting malware, viruses, or other security threats, or obtain threat detection results from a different device. In some examples, the user mode service can scan the file by reading it and comparing its contents against known virus signatures, and/or use other techniques.

In some implementations, the user mode service determines whether to scan files (e.g., all files) opened by the particular process based on predetermined rules. For example, the predetermined rules can indicate that certain types of processes can open files that pose a potential security threat, such as script files or other files including executable code. For example, JavaScript engine processes can open such files. The predetermined rules can indicate that other types of processes are safe to open files, such as processes that open benign data files that have no executable code. The particular process is scanned and categorized by the user mode service to determine whether or not it is a type of process that can open files having a potential security threat such that files opened by the particular process are to be scanned.

In some implementations, the kernel driver can scan the executable file, instead of sending a request to the user mode service to scan the file. For example, the kernel driver can be an anti-malware driver capable of performing such scans. Block 404 can be followed by block 406.

In block 406, the kernel driver receives a reply from the user mode service that is related to the scan of the executable file and determination performed by the user mode service in response to the request in block 404. The reply can include event classification information similarly as described for block 206 of FIG. 2 and for FIG. 3. The reply can include a configuration or an indication that indicates whether files (e.g., all files) opened by the particular process are to be scanned. In some implementations, a flag or other data can be included in (or accompanying) the event classification information for the particular process, where the flag indicates whether all files opened by the particular process should be scanned. In some implementations, all events (including file open events) can be allowed to continue without a scan by storing the appropriate instruction in all the event types in the event classification information. Block 406 can be followed by block 408.

In block 408 the kernel driver temporarily stores a scan indicator in a context associated with a file object of the executable file of the particular process. In some implementations, the scan indicator can be stored with event classification information in the context. For example, the file object is created by the operating system when the executable file is opened, and the context is a group of data associated with the file object that can preserve that data across I/O operations. The scan indicator is temporarily stored in the context so that it can be retrieved later in method 400 as described below. In some example implementations, the scan indicator can be stored in a stream context associated with a file stream of the executable file for which the file object was created. In some example implementations, in a Windows® operating system, a minifilter context can be attached to the file object. In some implementations, the scan indicator can be stored separately from the context and/or file object and can be pointed to or referenced by the context.

The scan indicator can be information indicating whether to scan files opened by the particular process (e.g., events that open files by the particular process) and/or files otherwise targeted by the particular process (e.g., other file events such as file read, file write, SectionSync, etc.). In some implementations, the scan indicator can be included in or accompany event classification information as described for method 200 of FIG. 2. For example, the scan indicator can be included in a data structure (e.g., table or portion of a table) including a process identifier and event types for the particular process, e.g., similar to a row of table 300 as an example. In some implementations, a scan indicator can be stored in the context and event classification information is not used or stored. Other information can also be stored in the context, such as event classification information including process identifiers and event types as described above. Other information stored in the context can also include list access instructions that indicate whether to access a list (or other data structure) of file information such as file names and/or file types as described herein; or such instructions can be stored in other storage instead of the context. In some examples, the scan indicator (and/or other information) can include or can be referenced by reference information that refers or points to the scan indicator and/or other information, where the reference information is stored in a different storage location from the context. For example, the reference information can be a pointer, address, index into an array of a table, etc., that allows the scan indicator and other information to be accessed or retrieved. Block 408 can be followed by block 410.

In block 410, a process start event associated with the opened executable file is intercepted by the kernel driver. The process start event occurs after the file open event detected in block 402. In some examples, the kernel driver can register with the operating system to be alerted of the occurrence of process start events and/or process stop events. In some implementations, the kernel driver can obtain and save information associated with the triggering of the process start event, such as the process identifier of the particular process being created.

In some implementations, the kernel driver determines and assigns a unique identifier to the particular process, e.g., in block 410 or 412. For example, the operating system may re-use one or more same process identifiers for different processes that initiate. The kernel driver can uniquely identify a process by creating a unique ID for the process. In some examples, the unique ID can be any number that can be associated with the process identifier, e.g., a number based on a constantly increasing sequence as each unique ID is assigned, a number based on the current device time, etc., and/or the unique ID can include, or be based on, the process identifier of the process. When the process identifier is described as being used in method 400 (e.g., in communications between the kernel driver and the user mode service), then the unique ID can also or alternatively be used to be sure that the appropriate process is identified. Block 410 can be followed by block 412.

In block 412, the kernel driver detects an executable image from the executable file of the particular process being loaded into the memory of the device for execution, and the scan indicator (and other information) stored in the file object context in block 408 is associated with the process identifier obtained from the process start event in block 410. For example, the image can be the code and data of the executable program that is a snapshot of the program in an initial state that is ready to be executed (e.g., it has not been partially executed). This image load event allows the kernel driver to associate the process identifier (and unique identifier) determined in block 410 with the scan indicator instructions as to whether to scan files opened by the particular process, and with any other information related to scanning (e.g., event classification information, list access instructions, etc.). For example, the kernel driver can use load-image routines provided by the operating system of the device to detect the loading of the image (e.g., in a Windows operating system, routines such as PsSetLoadImageNotifyRoutine).

In some implementations, the image load event can provide a process identifier and a file object to the kernel driver. The kernel driver can compare the process identifier obtained in block 410 to the process identifier obtain in block 412 to determine whether the image load event of block 412 is associated with the particular process associated with the process identifier of block 410. If the image load event is associated with the particular process, the kernel driver finds the scan indicator associated with the executable file and associates the scan indicator with the process identifier. This can be implemented in any of various ways. In some implementations, the kernel driver can use one or more load-image routines described above to determine the process identifier for the particular process and to derive the scan indicator from a structure of the file object used to specify load image information, where the process identifier and structure is provided in a callback to the kernel driver registered to receive the callback when the image is loaded into memory. The kernel driver can obtain the scan indicator based on the context associated with the file object (e.g., the scan indicator can be stored in the context or stored separately and pointed to or referenced by the context). In another example, the kernel driver can use a minifilter interface in the Windows operating system to access the context and retrieve the scan indicator.

The obtained scan indicator (and other information) can be associated with the process identifier of the particular process in various ways. For example, the kernel driver can store a data structure such as a table that includes a process identifier, unique identifier, associated event types, and scan indicator for each process active on the device, e.g., similar to the table 300 of FIG. 3 (e.g., a scan indicator column can be added to table 300). In some implementations, list access information can also be included, e.g., in another column of table 300.

Block 414 can be performed after block 412 and while the particular process is still active on the device. In block 414, a file event that is initiated by the particular process is intercepted by the kernel driver. This event is based on a file operation performed by the particular process to open a particular file, write to a particular file, etc., e.g., to access data in the particular file and/or perform one or more other operations with the particular file. The kernel driver pauses the file event to perform further blocks. Block 414 can be followed by block 416.

In block 416, the kernel driver accesses the scan indicator for the particular process to determine whether to scan the particular file. For example, the kernel driver can access a data structure that stores the process identifier of the particular process and the associated scan indicator for that process identifier, e.g., a table that includes event classification information, a scan indicator indicating whether to scan files (e.g., all files) targeted by the particular process, and/or other information indicating whether to scan no files and allow all events for the particular process, compare the file to a list of file information such as file names and/or file types, etc. For example, as shown in FIG. 3, the event classification information can include multiple event types, one of which can be an event type of a "file open" event which can apply to the current event. Block 416 can be followed by block 418.

In block 418, it is determined whether to scan the particular file that is to be opened by the particular process, based on the scan indicator (and/or other information) accessed in block 416. For example, if the scan indicator indicates to scan all files of events by the particular process, then the particular file is to be scanned. In some implementations, if the scan indicator indicates to not scan all such files, event classification information and/or other information can also be accessed to determine whether to scan. For example, if event classification information indicates to scan this type of file event, and/or list access instructions indicate to consult the list of file information and the particular file is present on the list of file information, then the particular file is to be scanned; otherwise, the file is not to be scanned.

If the particular file is to be scanned, the process continues to block 420, in which the particular file is caused to be scanned before being processed (e.g., opened). In some examples, the kernel driver can send an indication to a user mode service (e.g., anti-virus service) to scan the particular file and the driver waits for a reply. The user mode service can send back a reply indicative of the result of the scan. For example, the reply can indicate to perform a security operation such as to block (e.g., stop or cancel) the particular file from being processed (e.g., if the particular file is determined to include malware or cause a threat when executed) and/or other actions (e.g., block the particular file from being processed and stop the particular process from executing due to particular threats being determined), or to allow the particular file to be processed (e.g., similarly to block 422). In some implementations, the kernel driver can perform a scan in block 420.

If the particular file is not to be scanned as determined in block 418, then the method continues to block 422, in which the particular file is allowed to be processed (e.g., opened) without being scanned in method 400. In some implementations, the kernel driver does not notify the user mode service of the result, or in other implementations, the kernel driver can send the event to the user mode service to notify the service and allow the file to be processed without waiting for a reply from the service. In some implementations, notify instructions can be accessed to determine whether or not to send the result to the user mode service in block 418, similarly as described previously. In some implementations, if the particular file is determined to not be scanned in block 418, it can still be scanned by other methods or facilities and/or be subject to other threat detection techniques. The kernel driver can continue to monitor for events, e.g., a file event from the particular process as detected in block 412, and/or an open event for an executable file as detected in block 402.

In some implementations, the event classification information of method 200 and/or scan indicator of method 400 for a particular process can be stored in other ways. For example, the information can be cached by the user mode service and sent to the kernel driver upon a process start event for the particular process, stored in a cache associated with the executable file of the particular process, stored in a list associated with a name of the process (e.g., the name of the executable file), etc.

In some implementations, other types of events can be similarly processed by method 400 in addition to or instead of file events. For example, for events such as process events that target a process (e.g., start process, exit process), registry events that target one or more registry entries (e.g., registry read, registry write, etc.), or other events (including any events as described above with respect to FIG. 2), a respective scan indicator can be determined indicating whether to scan all events that target a particular data type, e.g., scan the target data of the event (e.g., file data, registry data, process data, etc.) similarly as for file events in method 400 and stored in a data structure, e.g., similar to table 300 of FIG. 3. These other types of events can be detected in block 414 instead of or in addition to file events, and the appropriate scan indicator accessed to determine whether to scan the event data.

In some implementations, method 400 of FIG. 4 can include updating scan indicators (and event classification information and other information) by the user mode service, e.g., similar to blocks 228-232 of FIG. 2.

In some implementations of method 200 and/or method 400, the kernel driver can receive event classification information associated with the particular process from the user mode service when the user mode service receives the process start event for the particular process. For example, the user mode service can provide this classification information based on information it has obtained from one or more previous events or other sources. For example, a previous event or other information can indicate whether the particular process, and/or particular events initiated by the particular process, are benign or potentially threatening to security.

In some implementations of method 200 and/or method 400, a default set of event classification information can be stored and accessible to the kernel driver to determine whether to perform a security scan for an event type, similarly as for the event classification information (and/or scan indicator) as described above. Such default classification information can be used, for example, if no event classification information is available or has been obtained for the particular process by the kernel driver (e.g., the user mode service has not yet sent event classification information).

In various implementations, various blocks of methods 200 and/or 400 may be repeated, combined, split into multiple blocks, performed in parallel, performed asynchronously, or performed periodically. In some implementations, one or more blocks of methods 200 and/or 400 may be repeated, may not be performed, or may be performed in a different order than shown in FIGS. 2 and 4. Methods 200 and/or 400, or portions thereof, may be repeated any number of times using additional inputs, e.g., when an event is detected by the kernel driver. Various portions of method 400 can be used in method 200, and vice-versa.

Figure 5:
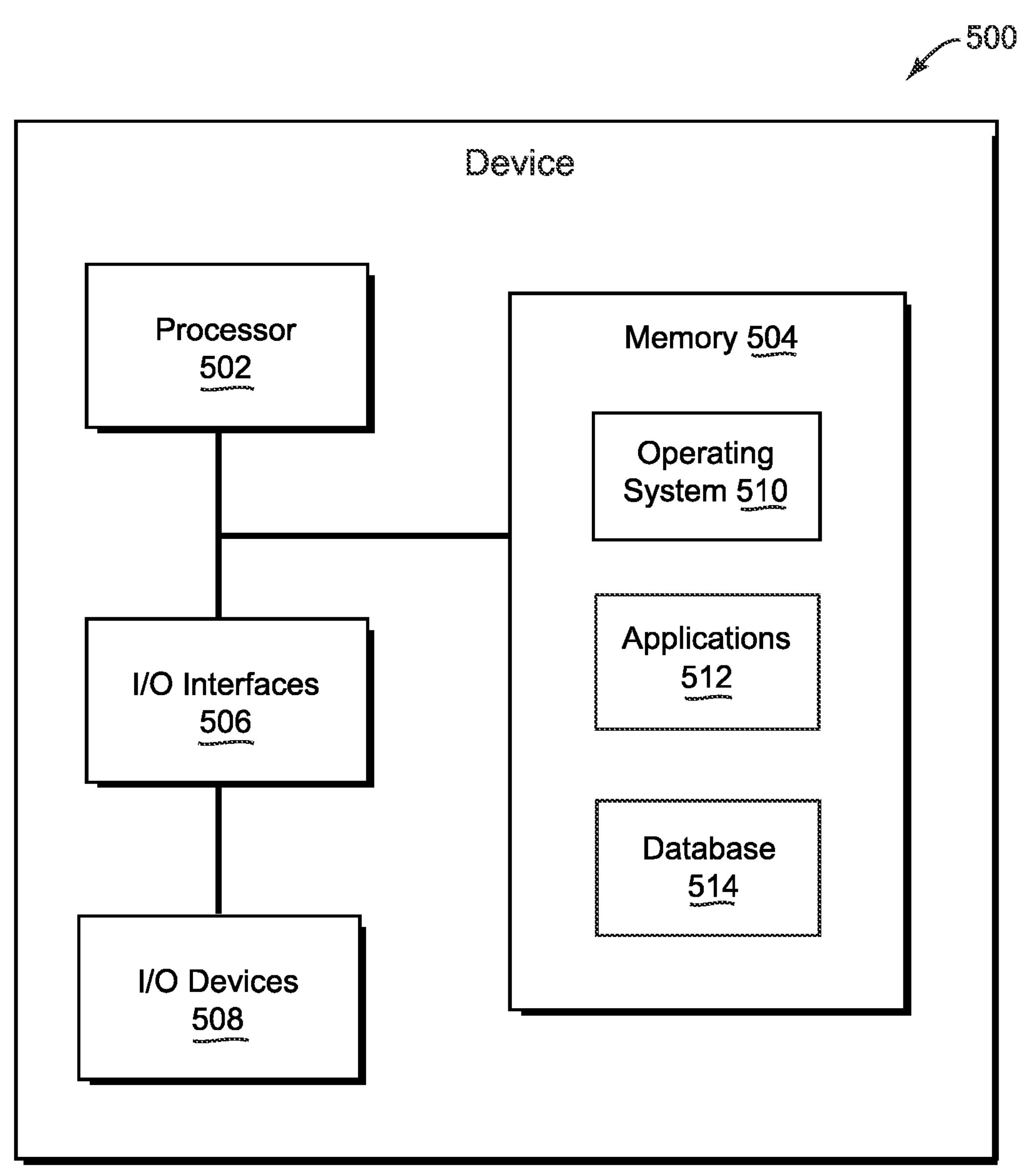
FIG. 5 is a diagram of an example computing device which can be used to implement one or more features described herein, in accordance with some implementations.

FIG. 5 is a diagram of an example computing device 500 which may be used to implement one or more features described herein, in accordance with some implementations. In some examples, device 500 may be used to implement an endpoint device, e.g., endpoint device 112 shown in FIG. 1. Device 500 can be any suitable computer system, server, or other electronic or hardware device. For example, device 500 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). Device 500 includes one or more processors 502, nontransitory computer readable medium or memory 504, input/output (I/O) interfaces 506, and I/O devices 508, all of which may be operatively coupled to each other by a bus.

Processor 502 can be one or more processors and/or processing circuits to execute program code and control basic operations of the device 500. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 502 may include one or more co-processors that implement neural-network processing. A processor may perform its functions in "real-time," "offline," in a "batch mode," etc. A computer may be any processor in communication with a memory.

Memory 504 is typically provided in device 500 for access by the processor 502, and may be any suitable computer-readable (processor-readable) storage medium, such as random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can include any other type of storage (magnetic disk, optical disk, magnetic tape, or other tangible media) and can be considered "storage" or "storage devices."

Memory 504 can store software operating on the device 500 by the processor 502, including an operating system 510, applications 512, and database(s) 514. Applications 512 and/or operating system 510 can include a security agent that can include instructions that enable processor 502 to perform one or more techniques described herein, e.g., the methods of FIGS. 2 and/or 4, and can include a user mode service and kernel driver as described herein. Applications 512 can include other threat detection or security applications, networking or communication applications, etc. Database 514 can include one or more databases, data structures (trees, tables, etc.), etc., that can store device information (e.g., device type, operating system, version number, etc.), scanning related information (e.g., event classification information, scan indicators, list access information, lists of file information, etc.) as described herein, file information related to files received by the device 500, security threat information, received network data, lists of rogue malware and URLs, etc., or any other data used in features described herein.

In operation, processor 502 may execute applications 512 stored in memory 504 and functions of operating system 510. Applications 512 and operation system 510 may include software instructions that, when executed by the processor, cause the processor to perform operations for scanning files based on process identification in accordance with the present disclosure (e.g., performing one or more of the operations described with reference to FIGS. 1-4). Application programs 512 may operate in conjunction with the database 514 and the operating system 510. In some implementations, executing processes as described herein can be created based on application programs 512.

I/O interfaces 506 can provide functions to enable interfacing the device 500 with other systems and devices. Interfaced devices can be included as part of the device 500 or can be separate and communicate with the device 500. Device 500 can communicate with other devices (e.g., an endpoint device, a firewall, a wireless access point, or a threat management system) via the I/O interfaces 506. For example, local or remote network and/or wireless communication devices, storage devices (e.g., memory and/or database), and input/output devices can communicate with processor 502 and memory 504 via I/O interface 506.

I/O devices 508 can connect to I/O interfaces 506 can include a variety of types of devices, including one or more display devices that can be used to display information, e.g., text, images, video, and/or a user interface of applications 512. A display device can be connected to device 500 via local connections (e.g., display bus) and/or via networked connections and can be any suitable display device, e.g., LCD, LED, or plasma display screen, CRT, television, monitor, touchscreen, 3-D display screen, or other visual display device. A display device may also act as an input device, e.g., a touchscreen input device. The display device can be a flat display screen provided on a mobile device, multiple display screens provided in glasses or a headset device, or a monitor screen for a computer device. I/O devices 508 can also include various other devices such as input devices (keyboard, pointing device, touchscreen, microphone, camera, scanner, sensors, etc.) and/or output devices (speaker devices, printers, motors, etc.).

For ease of illustration, FIG. 5 shows one block for each of processor 502, memory 504, I/O interfaces 506, and I/O devices 508. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. While some components are described as performing blocks and operations as described in some implementations herein, any suitable component or combination of components of environment 100, device 500, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer-readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

It will be appreciated that one or more modules, processes, systems, and sections described above may be implemented in hardware, hardware programmed by software, software instructions stored on a nontransitory computer readable medium or a combination of the above. The instructions may be compiled from source code instructions provided in accordance with a programming language such as C, C++, C#.net, assembly, Java, or the like. Instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus.

Furthermore, the steps, modules, processes systems, and sections (or their sub-components or modules) may be implemented as a single processor or as a distributed processor (single and/or multi-core, or cloud computing system). The methods, modules, processors, systems and computer readable media (or computer program product) described herein may be implemented as a programmed general purpose computer, a special-purpose computer, an integrated circuit device, a programmed microprocessor or microcontroller and peripheral integrated circuit element, a semiconductor chip, a network server or switch, an ASIC or other integrated circuit, a digital signal processor, a hardwired electronic or logic circuit such as a discrete element circuit, a programmed logic circuit such as a PLD, PLA, FPGA, PAL, an electronic device programmed with microcode, a hard-wired analog logic circuit, software stored on a computer-readable medium or signal, an optical computing device, a networked system of electronic and/or optical devices, and/or a software module or object stored on a computer-readable medium or signal, for example. In general, any processor capable of implementing the functions or steps described herein may be used to implement implementations of the method, system, or a computer program product (software program stored on a nontransitory computer readable medium).

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

It should be noted that there may be information collected about compute instances and users, and this may have privacy implications and scalability implications. Privacy may be addressed in some cases by user notifications and permissions, anonymization, tokenization, and encryption. It may also be useful to optimize the network data being collected or analyzed by one or more of coalescing the data, compressing the data, or serializing the data. Security features may be used to avoid abuse of APIs (e.g., authentication, replay protection, DoS protection). Performance optimizations, such as rate limiting, prioritization, and queue management may be used to improve scalability.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term “or” should generally be understood to mean “and/or” and so forth. The use of any and all examples, or exemplary language (“e.g.,” “such as,” or the like) provided herein, is intended merely to better illuminate the implementations and does not pose a limitation on the scope of the implementations. In the description, it is understood that terms such as “first,” “second,” “top,” “bottom,” “up,” “down,” and the like, are words of convenience and are not to be construed as limiting terms. No language in the specification should be construed as indicating any unclaimed element as essential to the practice of the implementations.

While the disclosed subject matter has been described with respect to a number of implementations, these particular implementations are merely illustrative, and not restrictive. It is evident that many alternatives, modifications and variations would be, or are, apparent to those of ordinary skill in the applicable arts. Features illustrated in the examples can be embodied in many different forms and may be applied to other examples and implementations.

What is claimed is:

1. A computer-implemented method comprising:

intercepting, by one or more processors, an event initiated by a particular process that executes on a system, wherein the intercepting includes pausing the event;

determining whether to perform a security scan for the event based on a comparison of a type of the event with stored event classification information associated with the particular process;

in response to a determination to perform the security scan:

causing the security scan of the intercepted event to be performed; and based on the performance of the security scan, allowing the intercepted event to proceed or performing a security operation associated with the intercepted event; and in response to a determination to not perform the security scan, allowing the intercepted event to proceed.

2. The computer-implemented method of claim 1, wherein the security operation associated with the intercepted event includes at least one of:

blocking the intercepted event; or stopping the particular process from execution on the system.

3. The computer-implemented method of claim 1, wherein the event classification information is based on an evaluation of an executable file associated with the particular process to determine types of events initiated by the particular process that are to receive the security scan.

4. The computer-implemented method of claim 1, wherein causing the security scan of the event to be performed includes:

sending the intercepted event to a user mode service that executes on the system; and receiving a reply from the user mode service;

wherein allowing the intercepted event to proceed or performing the security operation associated with the intercepted event are based on the reply.

5. The computer-implemented method of claim 4, further comprising, prior to intercepting the event:

obtaining, by the one or more processors, the event classification information from the user mode service including:

detecting that the particular process has initiated;

in response to detecting that the particular process has initiated, sending a request to the user mode service; and receiving the event classification information from the user mode service in response to the sending the request.

6. The computer-implemented method of claim 5, further comprising, after determining whether to perform the security scan for the intercepted event:

obtaining updated event classification information from the user mode service; and using the updated event classification information to determine whether to perform an additional security scan for a subsequent event initiated by the particular process.

7. The computer-implemented method of claim 4, wherein intercepting the event includes intercepting a file open event for a target file, wherein the user mode service scans the target file.

8. The computer-implemented method of claim 1, further comprising:

determining a process identifier of the particular process; and associating the event classification information with the process identifier.

9. The computer-implemented method of claim 1, wherein the event classification information indicates one or more types of events that can be performed by the particular process which are to be security scanned, and wherein the security scan uses one or more threat detection techniques to determine a potential security threat in the intercepted event.

10. The computer-implemented method of claim 8, wherein associating the event classification information with the process identifier includes temporarily storing the event classification information in, or referenced by, a context associated with a file object that is associated with an executable file that is opened to initiate the particular process.

11. The computer-implemented method of claim 10, wherein associating the event classification information with the process identifier includes:

detecting an image load event associated with the particular process; and in response to detecting the image load event, accessing the event classification information in or referenced by the context and associating the event classification information with the process identifier.

12. The computer-implemented method of claim 8, wherein determining the process identifier of the particular process includes:

detecting a process start event for the particular process; and in response to detecting the process start event, obtaining and storing the process identifier of the particular process.

13. The computer-implemented method of claim 1, wherein the particular process is a first process and the event classification information is first event classification information, and further comprising obtaining second event classification information associated with a second process executing on the system, wherein the second event classification information is different than the first event classification information.

14. The computer-implemented method of claim 1, wherein the event classification information indicates a plurality of types of events that can be performed by the particular process, wherein the types of events include at least one of: file open, file close, file read, file write, start process, exit process, registry read, or registry write.

15. The computer-implemented method of claim 1, further comprising:

determining, based on an evaluation of an executable file associated with the particular process, whether files that are opened by the particular process are to be scanned;

determining that the event is a file open event to open a file;

obtaining a list of file information including at least one of: file name extensions or file types;

in response to a determination that all files that are opened by the particular process are to be scanned, or a determination that the file has a file name extension or a file type in the list of file information, determining to perform a security scan for the file open event; and in response to a determination that not all files opened by the particular process are to be scanned and a determination that the file does not have any of the file name extensions or the file types in the list of file information, allowing the file open event to proceed.

16. The computer-implemented method of claim 1, wherein the particular process is included in at least two processes that execute on the system, wherein each process of the at least two processes is associated with a different set of event classification information that indicates a respective plurality of events that can be performed by the process.

17. A system comprising:

one or more hardware processors; and a memory coupled to the one or more hardware processors, with instructions stored thereon, that when executed by the one or more hardware processors, cause the one or more hardware processors to perform operations comprising:

intercepting an event initiated by a particular process that executes on the system, wherein the intercepting includes pausing the event;

determining a process identifier of the particular process;

determining whether to perform a security scan for the event based on a comparison of a type of the event with stored event classification information associated with the process identifier;

in response to a determination to perform the security scan:

sending the intercepted event to a user mode service that executes on the system to perform the security scan for the intercepted event;

receiving a reply from the user mode service; and based on the reply, allowing the intercepted event to proceed or performing a security operation associated with the intercepted event; and in response to a determination to not perform the security scan, allowing the intercepted event to proceed.

18. A computer-implemented method comprising:

intercepting, by one or more processors, an event that is to open and execute an executable file to initiate a particular process on a system;

determining, based on a scan of the executable file, whether to perform a security scan on files that are opened by the particular process; and in response to a determination to perform the security scan on the files that are opened by the particular process:

storing a scan indicator and associating the scan indicator with a process identifier of the particular process, wherein the scan indicator indicates to perform the security scan on the files opened by the particular process; and in response to detecting file open events initiated by the particular process to open one or more of the files, accessing the scan indicator associated with the process identifier to cause respective security scans of the one or more files to be performed; and in response to a determination to not perform the security scan on the files that are opened by the particular process, allowing the file open events performed by the particular process to proceed.

19. The computer-implemented method of claim 18, further comprising:

providing a list of file information including at least one of: file name extensions or file types; and in response to the determination to not perform the security scan on the files that are opened by the particular process and a determination that the one or more files have at least one of the file name extensions or file types in the list of file information, causing a security scan of the one or more files to be performed.

20. The computer-implemented method of claim 18, wherein determining whether to perform the security scan on the files that are opened by the particular process includes:

requesting a user mode service to scan the executable file; and receiving event classification information from the user mode service, wherein the event classification information is associated with the particular process and indicates whether to perform the security scan on the files that are opened by the particular process.

* * * * *